Dec. 18, 1951  F. DANIELS ET AL  2,578,674
NITRIC OXIDE RECOVERY SYSTEM
Filed March 28, 1949  4 Sheets-Sheet 1
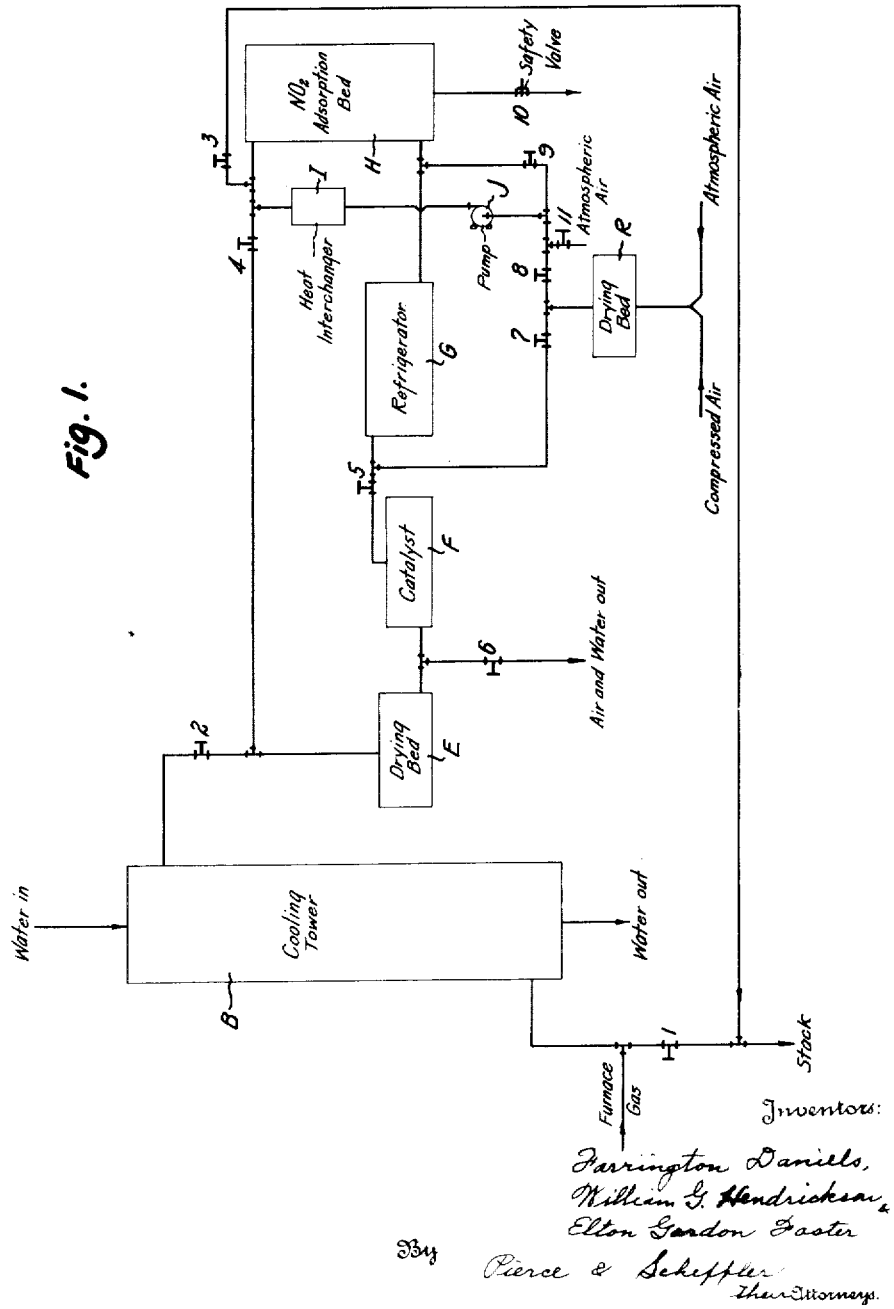

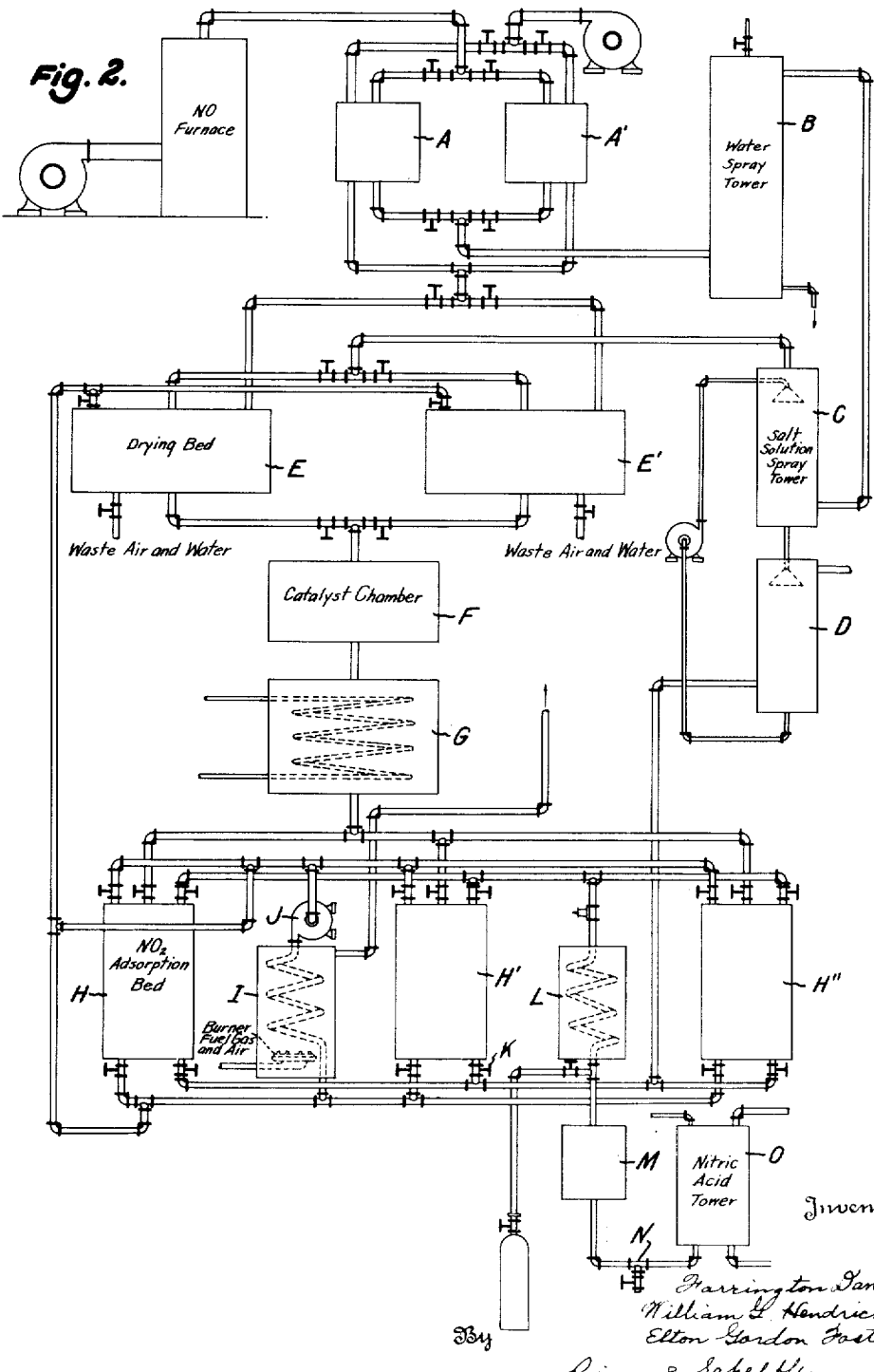

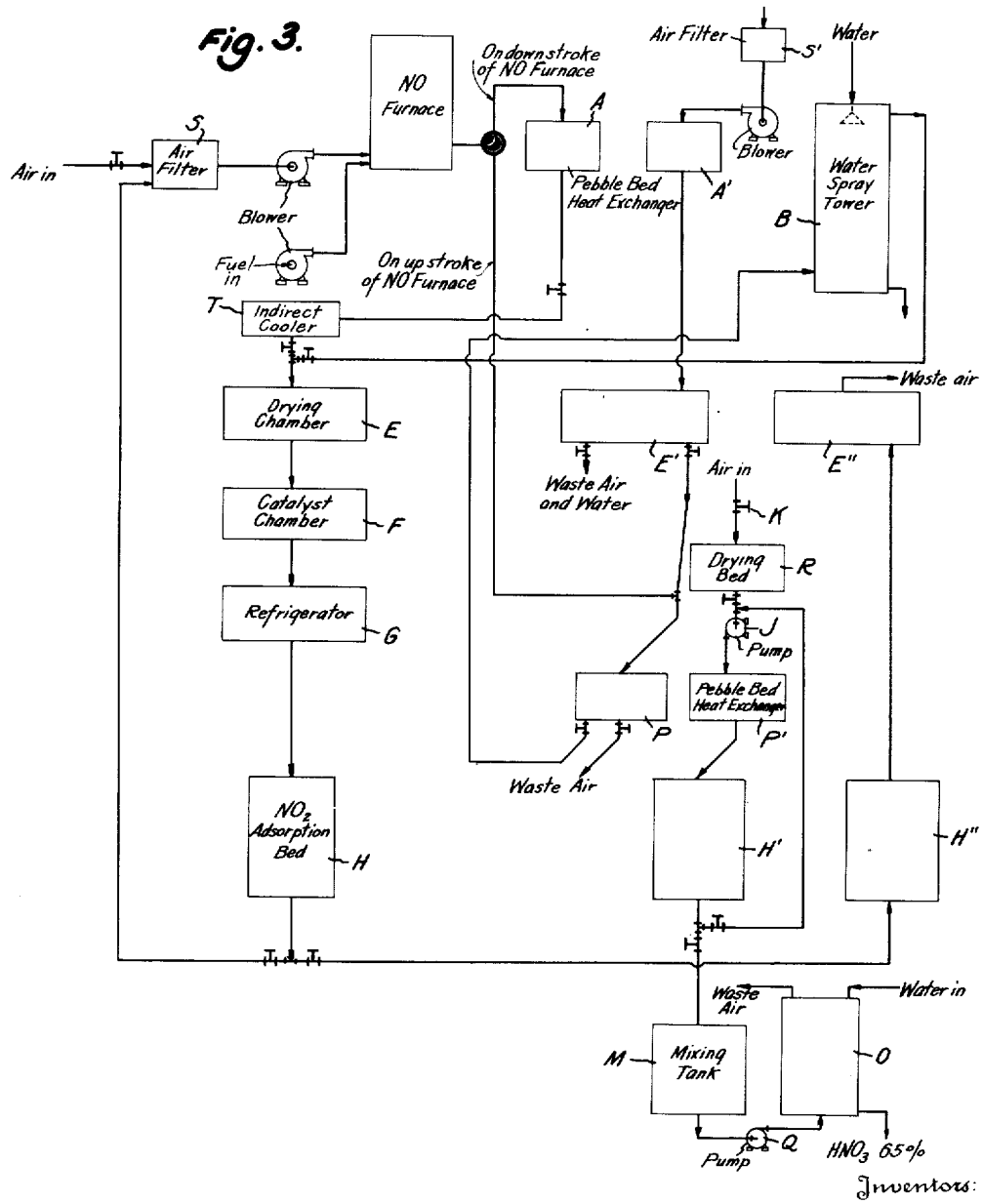

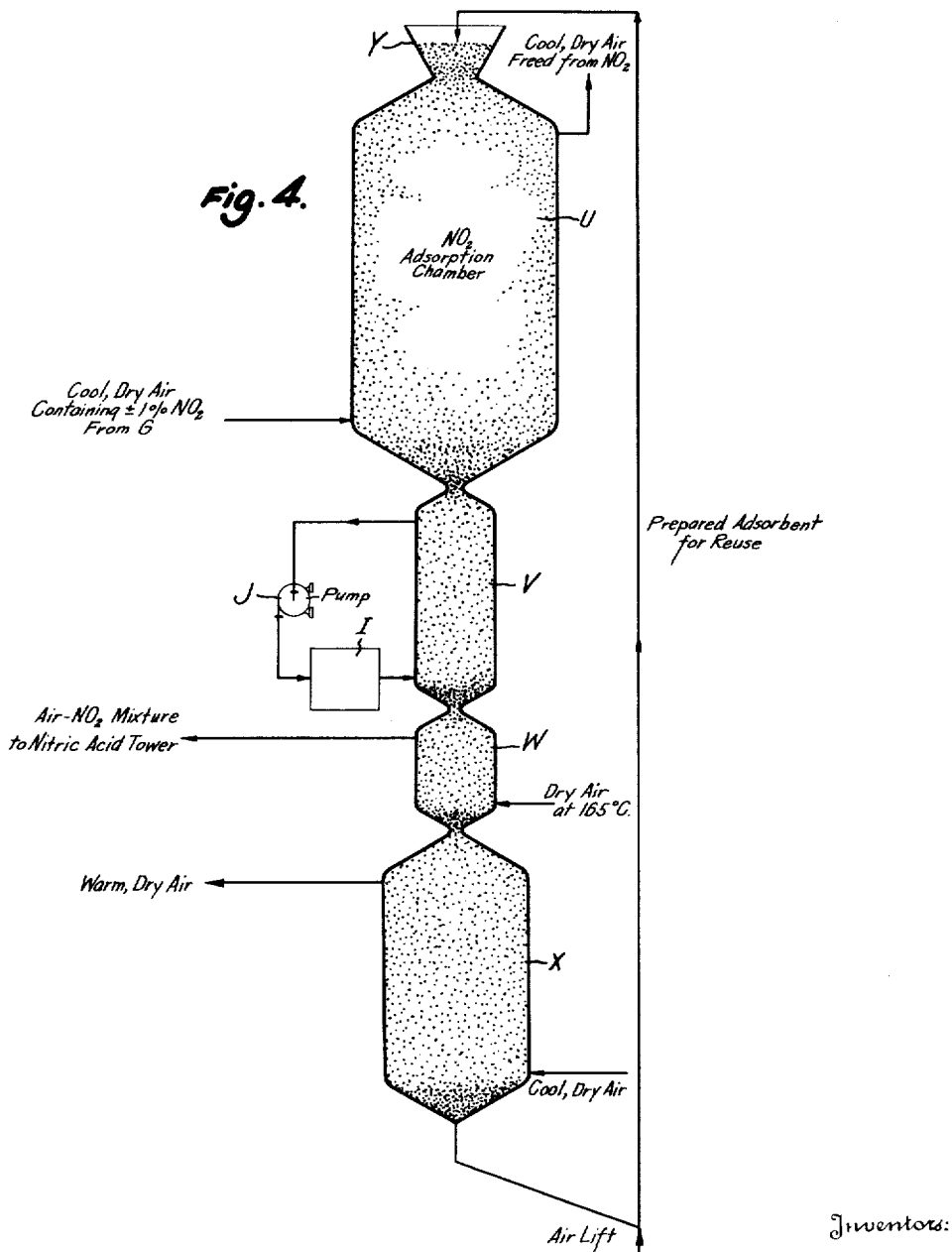

Patented Dec. 18, 1951

2,578,674

UNITED STATES PATENT OFFICE 2,578,674

NITRIC OXIDE RECOVERY SYSTEM

Farrington Daniels, Madison, Wis., William G. Hendrickson, San Jose, Calif., and Elton Gordon Foster, Wilmington, Del., assignors to Wisconsin Alumni Research Foundation, Madison, Wis., a corporation of Wisconsin Application March 28, 1949, Serial No. 83,866

18 Claims. (Cl. 23—161)

This invention relates to the art of recovering oxides of nitrogen from gaseous mixtures containing the same. More particularly, this invention is concerned with the production of concentrated nitrogen dioxide from the nitric oxide content of a moisture-containing gas (specifically air) mixture containing nitric oxide in low concentration, e. g., such gas mixtures as are produced by the oxidation of ammonia, by the arc process of fixing atmospheric nitrogen, and, in particular, by the Wisconsin thermal process of fixing atmospheric nitrogen for which latter chiefly the present recovery system was devised.

When nitrogen and oxygen of the air are partially combined, by the electric arc process or by the Wisconsin thermal process, to give nitrogen oxides, the nitric oxide is present in the resulting gaseous mixture to the extent of from say 1% to about 3% at most. The mixture contains all of the moisture originally contained in the air used as starting material, and may contain additional moisture in the case of the air-nitric oxide mixture produced by the Wisconsin process. The recovery of this nitric oxide on an industrial scale is difficult and expensive by conventional methods. According to prior practice, the air-nitrogen oxides mixture is passed through very large chambers, to allow sufficient time for the reaction

and then through enormous packed towers wherein the gas mixture is contacted with water in order to form nitric acid. For instance, in the recovery of 1 ton of nitric acid (35% concentration) per day from a 1% nitrogen dioxide-air mixture, using the conventional process and apparatus, towers with 6000 cu. ft. of contact volume would ordinarily be required. The water content of the gas mixture is or may be so large that nitric acid produced directly from such gas mixture must be quite dilute.

In the nitrogen oxides-containing gas mixtures resulting from the oxidation of ammonia there usually is a large excess of nitrogen and much water vapor, but little oxygen. The concentration and recovery process of the present invention is applicable also to such nitrogen oxides-containing gas mixtures; thereby it is easy to obtain the nitrogen dioxide in a pure state or in any concentration (in air) desired. By increasing the concentration the size of the absorption towers may be greatly reduced. Again, the present process is especially suited to the production of pure dry liquid nitrogen dioxide (or nitrogen tetroxide).

An object of the present invention is the provision of an improved process whereby to obtain a concentrated nitrogen dioxide product from a gas mixture containing, besides air, only about one or at most a few per cent of nitric oxide. Another object of the invention is the provision of a nitrogen dioxide-producing process which requires materially less plant space and equipment than conventionally found necessary. A further object of the invention is the recovery of highly concentrated or substantially pure nitrogen dioxide from a gas mixture containing the latter in low concentration. Another inventive object is the production of a substantially moisture-free concentrated nitrogen dioxide from the nitric oxide of a moisture-laden air-nitric oxide mixture in which the nitric oxide is in low concentration. Other inventive objects include the provision of novel apparatus for effecting the aforesaid process.

By the carrying out of the process of this invention nitrogen dioxide can be concentrated from say 1%, 1½% or 2% up to any convenient value, say 20% to 40% in air, and thereby the size of the nitric acid towers can be reduced to less than one-tenth that conventionally required for handling the low concentration nitrogen dioxide. Or, the concentration can be increased to nearly 100%, in which event the nitrogen dioxide may then be liquefied or adsorbed and transported on a suitable adsorbent. This method not only effects concentration of nitrogen dioxide but also removes the excess of water and permits the direct production of concentrated nitric acid. Such removal, or partial removal, of water is effected in the same operation by which the nitrogen dioxide is concentrated. Moreover, by the process of the present invention nitric oxide is very rapidly oxidized to nitrogen dioxide, whereby the large chambers ordinarily employed for giving sufficient time for the

reaction can be dispensed with.

The process of the present invention comprises the steps of cooling the oxides of nitrogen-containing gaseous mixture and drying the latter usually by passing it through a body, shower, stream, layer or bed of solid adsorbent having a preferential adsorptability towards water; passing the dried gas mixture over, through, or otherwise in contact with a catalyst mass having the function of accelerating oxidation of the nitric oxide content of the gas mixture to nitrogen dioxide at the expense of the oxygen content of said gas mixture; passing the dry gas mixture—preferably after cooling the same—in contact with particles of a solid adsorbent, such as silica gel or other form of silicon dioxide with very large surface area per unit volume of the material and having the property of adsorbing nitrogen dioxide, adsorbent carbon, titania gel, and the like, whereby the nitrogen dioxide is adsorbed on surfaces of the solid adsorbent material and thereby separated from the other components of the gas mixture; desorbing the greater part of the so-adsorbed nitrogen dioxide by circulating hot nitrogen dioxide (or a dry, hot air-nitrogen dioxide mixture comprising nitrogen dioxide) through and in direct contact with the solid adsorbent material; and flushing out practically all of the residual nitrogen dioxide (that is, removing practically all of the adsorbed nitrogen dioxide not already desorbed by the circulated hot $NO_2$ gas) by means of hot dry air (or other non-adsorbable and not readily liquefiable gas) passed through or otherwise in contact with the solid adsorbent material whereon the nitrogen dioxide had been adsorbed. Where the $NO_2$ product is to be converted to $HNO_3$, use of air (or other free-oxygen containing gas) is of course indicated. Where the $NO_2$ is to be liquefied, hot dry $CO_2$ or nitrogen or other non-adsorbable and not readily liquefiable gas could be used instead of hot dry air if so desired.

From the following description and illustrations of the applicants' invention it will be seen that water removal is accomplished at a very rapid rate and while the nitrogen oxides are still substantially in the form of NO: also, that in this novel method of operation:

(a) There is only a very small loss of nitrogen oxides in the drying bed, thus the efficiency of recovering the oxides is kept at a high level;

(b) Practically all the catalytic oxidation is accomplished while the gas is in a dry condition; under this condition the volume of equipment required for the oxidation of NO to $NO_2$ is kept to a minimum; and (c) Prevention of the formation of significant amounts of nitric acid in the drying bed obviates the complications which arise in regenerating a drying bed which has become contaminated with nitric acid.

It has been discovered that $NO_2$ is a particularly efficient heat transferring gas. One cubic foot of $NO_2$, within the temperature range from room temperature to 160° C., will carry approximately 8 times as much heat as the same volume of air at the same temperature, because the chemical dissociation of $N_2O_4$ into $2NO_2$ absorbs a large amount of heat, thereby greatly increasing the effective heat capacity of $N_2O_4$ (Edgar D. McCollum, J. A. C. S., vol. 49, p. 28 et seq.).

In applying this process to the recovery of oxides of nitrogen from the gaseous product of the Wisconsin thermal process for the fixation of atmospheric nitrogen, which gaseous product is discharged from the reaction furnace at a relatively elevated temperature, say, at a temperature of the order of 600° F. maximum, we have found it desirable to initiate the above-recited combination of steps by a stage or stages of cooling and lowering of the water content. Thus, we may simply pass the hot gaseous product countercurrently through a shower of cool water to effect a substantial cooling and lowering of the water content. By this expedient we have calculated that a furnace gas containing 5.5% $H_2O$ and 1% NO and at an entrant temperature of 660° F., when subjected to such water shower (water at a temperature of 61° F.) is cooled to 67° F. and contains only 2.25% $H_2O$; its NO content is reduced to 0.974%, 0.026% NO having been lost in passage of the gas through the spray tower by reason of oxidation of some nitric oxide to nitrogen dioxide and reaction of the latter with water to form nitric acid,

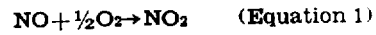   (Equation 1)

and

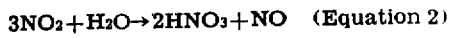   (Equation 2)

While nitric oxide itself is only very slightly soluble in water, its oxidation product ($NO_2$) readily reacts with water according to Equation 2. It will be understood, therefore, that the extent to which the generally slow reaction of Equation 1 above takes place in the spray tower is determined largely by the time the gases remain in the tower.

Alternatively, we can substitute a salt solution, e. g., a solution of calcium nitrate, $Ca(NO_3)_2$, for the water used in the above mentioned spray tower. Because the vapor pressure of the water from the salt (e. g., calcium nitrate) solution is less than the vapor pressure of pure water, the salt solution is more effective than water per se for dehumidifying the furnace gas. The used salt solution can be regenerated (i. e., cooled and concentrated) when so desired by for example passing a cool dry inert gas (e. g., cool dry air) through it.

We may, with very good results, use both of the above expedients, in which event the water spray step is followed by the salt solution spray step.

The final drying of the furnace gas can be accomplished economically by passing the gas through a mass of solid particles of an adsorbent having a preferential adsorptability towards water. Silica gel per se and other forms of silicon dioxide having very large surface area per unit volume are effective in this relation. Thus, it has been found that when a gas containing 0.84% NO and 2.8% $H_2O$ is passed at the rate of 67 cu. ft. per minute per square ft. of superficial bed area through a silica gel bed 6.7″ deep, the silica gel adsorbs water with an average efficiency of 99% over a period of 73 minutes. It is noted, in this connection, that the average efficiency of adsorption of nitrogen oxides by the silica gel over this same period of time has been found to be only approximately 3.5%; that is to say, we have discovered that it is possible to obtain 99% drying efficiency with only 3.5% loss of nitrogen oxides; if shorter cycles were used, the average drying efficiency and loss of nitrogen oxides would be somewhat greater. Only the NO which has been oxidized to $NO_2$ is capable of being adsorbed.

We have found that this is possible because: (1) silica gel adsorbs $NO_2$ at a relatively slow rate, i. e., at a rate which is, by comparison with its water vapor adsorption rate, very slow; (2) silica gel has a relatively low adsorptive capacity for $NO_2$; and (3) water-wet silica gel does not catalyze reaction 1 above. Nitric oxide is not adsorbed by silica gel in significant amounts, which phenomenon makes possible the present mode of separating the nitrogen oxides from the water.

During the operation of drying the furnace gas by adsorption of water vapor therefrom by the silica gel bed, approximately 1300 B. t. u. of heat are liberated for each pound of water so adsorbed. This liberated heat raises the temperature of the furnace gas and of the gel bed, thereby decreasing the adsorptive capacity of the gel. However, the potentially high adsorptive capacity of the gel can be maintained by the use of heat-dissipating means—e. g., by the use of heat interchangers such as cooling coils in the gel bed or in a chamber between two shorter gel beds—effective to maintain the desired low temperature of the gas by removing the heat substantially as rapidly as it is generated. This method is used because the silica gel itself is a very poor heat conductor. If the heat is not so removed, maintenance of efficiency of moisture removal can be effected by materially increasing the depth of the drying gel bed.

After the above described substantially complete dehydration of the furnace gas, the latter is so treated as to catalyze therein the reaction of Equation 1 above. Preferably, we effect this step by passing the dried gas through a bed of activated adsorbent silica gel, or equivalent adsorptive silicon dioxide material, which is partially or completely saturated with adsorbed nitrogen dioxide. The nitrogen dioxide dissolves the nitric oxide content of the dried furnace gas, and the dissolved nitric oxide almost instantaneously is oxidized, by oxygen from the furnace gas, to nitrogen dioxide. It is noted, in this connection, that the dried furnace gas itself, as delivered to the catalytic oxidation step, contains a very small amount of gaseous nitrogen dioxide by reason of the relatively slow oxidation of its content of gaseous nitric oxide; this content of gaseous nitrogen dioxide is adsorbed by the silica gel catalyst and hence of itself can provide the adsorbed nitrogen dioxide necessary for dissolving the nitric oxide from the gas stream, because the initially adsorbed nitrogen dioxide is augmented by the product of the catalyzed oxidation of the nitric oxide dissolved therein and soon completely saturates the silica gel catalyst bed. The gas stream effluent from this latter is substantially devoid of water and consists essentially of nitrogen, oxygen, carbon dioxide and gaseous nitrogen dioxide.

Because the heat of adsorption and the heat of oxidation both tend to raise the temperature of the gas, and because the adsorptive capacity of silica gel for nitrogen dioxide increases rapidly with decreasing gas temperature, it is advisable to cool the $NO_2$-containing gas effluent from the catalyst chamber before attempting to recover the nitrogen dioxide therefrom by selective adsorption. Accordingly, the next step of our process consists in refrigerating the $NO_2$-containing gas, as by passing the same over water or brine cooling coils. The amount of refrigeration resorted to depends largely upon its cost: an economic balance between cost of refrigeration and increased adsorptive capacity of the adsorbent for nitrogen dioxide must be worked out for each new situation. The optimum temperature has been calculated to be about 60° F.; at this temperature the silica gel adsorbs approximately 6.5% of its weight of nitrogen dioxide before becoming saturated by a stream of gas containing 1% $NO_2$. The heat of adsorption may be dissipated by the above described use of cooling coils in the adsorption gel bed.

In practice, it is economically impossible to completely saturate the silica gel, because of the too great loss of nitrogen dioxide during the latter part of the saturation operation. Before equilibrium is reached, the $NO_2$ in the effluent gas becomes an appreciable fraction of the $NO_2$ entering the adsorber. Thus, it has been found that if one passes 1.19% of $NO_2$ through a 3 foot bed of 10–14 mesh silica gel, at 15° C., at the rate of 100 ft./min., the bed adsorbs with 100% efficiency for 12 minutes. After 12 minutes, the adsorption efficiency begins to fall off and after 31 minutes only 75% of the $NO_2$ is adsorbed and 25% is wasted to the stack. The overall efficiency for the 31 minute period is approximately 95%, i. e., there is an over-all loss of 5% $NO_2$ through the final adsorption bed. During the 31 minute adsorption cycle the gel bed becomes approximately 75% saturated with $NO_2$. A lower temperature for adsorption or a deeper bed increases both the adsorption efficiency and the adsorptive capacity of the gel. An increased depth of bed increases the pressure drop; and, a lower temperature increases the refrigeration cost. Here is another instance where an economic balance must be worked out in order to determine optimum conditions.

The nitrogen dioxide may be desorbed from the adsorption gel bed by means of heat introduced into the latter. It is impractical to desorb by heating the container of the gel bed, because the gel is too poor a conductor of heat. We have discovered that desorption by means of a current of hot gas consisting essentially of nitrogen dioxide not only is possible but also is much more advantageous than is desorption by steam or by hot air as sole means. Circulation of hot $NO_2$ through the gel provides a direct method of heating the gel bed (and the adsorbed $NO_2$ therein) to desorption temperature without materially diluting the product, and is an economically efficient method for obtaining $NO_2$ in nearly any concentration desired.

Consequently, the next step of our complete process is to circulate a current of hot gas containing $NO_2$ through the adsorption bed until the latter has been brought to a desirable desorption temperature. To effect this operation, we heat a supply of $NO_2$, or, a gaseous mixture consisting largely of $NO_2$, to a temperature of approximately 165° C. and pass the so-heated gas through the adsorption bed, recirculating the desorbent between heater and adsorption bed until the latter and its content of adsorbed $NO_2$ have been heated to about 165° C. By means of this treatment the adsorption bed is caused to part from approximately 70% of its adsorbed $NO_2$. If the adsorbent is heated to a higher temperature level a higher percentage of the $NO_2$ will be released as nearly pure $NO_2$. An economic balance is required in each instance to determine the optimum temperature. The so-released gaseous $NO_2$, being mingled only with pure or substantially pure gaseous $NO_2$, constitutes a high purity $NO_2$ product adapted for direct use in any relation where nitrogen dioxide is desired: it may be liquefied as $N_2O_4$; or, it may be adsorbed on a suitable solid adsorbent, e. g., silica gel, for storage or transport; or it may be used in making nitric acid of any desired concentration by reaction of Equation 2 above.

After the above described desorption with hot gaseous $NO_2$, approximately an additional 25% of the adsorbed $NO_2$ can readily be recovered from the adsorption bed by sweeping the latter with about one volume of hot (165° C.) dry air. Generally, we prefer to limit the amount of air used in this second stage of the desorption to one to three volumes, i. e., to a volume equivalent to the volume of gaseous $NO_2$ originally adsorbed on the gel bed. The product resulting from their operation, being a gas mixture containing only approximately 20% NO₂, can be pumped through a water tower for conversion of the NO₂ into nitric acid; or, it can be otherwise employed wherever its content of NO₂ can be utilized and where the diluent is not objectionable.

The adsorption bed is prepared for reuse in adsorbing NO₂ by cooling the same, as by passage of a current of dry gas (e. g., dry air), at a desirably low temperature, therethrough.

The drying bed is prepared for reuse in dehydrating the furnace gas by a standard method, e. g., by passing a current of air at say 180° C. through the drying bed until the latter has reached a temperature of about 180° C., and thereafter cooling the resulting water-free drying bed by passing a cool dry gas (e. g., cool dry air) therethrough.

As will of course be appreciated, in the carrying out of our complete process on a commercial scale all of the above recited operations are carried on at the same time. For example, the commercial flow sheet calls for at least two drying beds and at least two NO₂ adsorption beds: while one drying bed and one adsorption bed are in operation another drying bed is being dehydrated and cooled and another adsorption bed is being desorbed, activated and cooled. This duplication of pieces of equipment calls also for plural pumps, etc., and for a complete system of conduits, valves, reversing mechanisms, etc., for uninterrupted handling of a continuous stream of NO-containing furnace gas.

This invention will now be described in greater particularity, with reference to the accompanying drawing, in which Fig. 1 is a simplified schematic representation of apparatus adapted for practicing the process of the present invention;

Fig. 2 is a schematic representation of a modified assemblage of apparatus elements for carrying out the process;

Fig. 3 is a schematic representation similar to that in Fig. 2 but illustrating a further modification of the assemblage of apparatus elements; and Fig. 4 is a schematic representation of a modification of a portion of the apparatus shown in Fig. 2.

The system illustrated in Fig. 1 is adapted for the production of NO₂ from a gas, containing about 1% NO, from a Wisconsin Process furnace producing NO equivalent to 0.63 ton of 100% HNO₃ per day, which furnace is being operated on half-cycle (i. e., fuel is being burned only during the upstroke of the cycle). The air requirement of this furnace is 500 SCFM, and, since there is little volume change due to combustion, the volume of furnace gas going to the recovery system likewise is approximately 500 SCFM.

It is assumed, for the purpose of this example, that air enters the NO furnace at 90° F. and 78% relative humidity (0.0242 lb. H₂O per lb. dry air), and that the effluent gas is at a maximum temperature of 660° F.; under these conditions it is calculated to contain 0.0339 lb. H₂O per lb. dry gas. For the sake of simplicity, the NO furnace is not shown, and only one of each of the apparatus elements of the NO recovery system is shown. It is to be understood that in a continuously operating system more than one each of certain of the apparatus elements are necessary, and that means for shifting one to another of the plural elements must be included.

Referring to Fig. 1, let it be assumed that recovery is begun near the end of an upstroke of the NO furnace cycle. The gas mixture effluent from the furnace is at a temperature of about 660° F., and contains 5.1% CO₂, 13.0% O₂, 5.5% H₂O, 75.4% N₂ and 1.0% NO by volume. Valves 2, 3 and 5 are open and valves 1, 4, 6, 7, 8, 9, 10, and 11 are closed. The furnace gas passes, in sequence through the cooling tower B, drying bed E, catalyst chamber F, refrigerant G, and NO₂ adsorption bed H, and thence to the stack.

The furnace gas enters cooling tower B at a point near the base of the latter and exits from the tower at a point near the top thereof. In passage through the tower the gas is contacted with a cooling water shower initially at a temperature of 61° F., there being fed to the top of the tower 100 lbs. of the cooling water per minute. The furnace gas effluent from cooling tower B is at a temperature of 67° F. and contains 0.974% NO and 2.25% H₂O, 0.026% NO having been lost in the formation of a minute amount of nitric acid in cooling tower B.

The cooled and partially dried furnace gas passes to drying bed E, which latter is a bed 30 inches in diameter and 8 inches in height, of initially dry adsorbent silica gel particles of about 6–8 mesh, Tyler screen. The gas, after passage through drying bed E, is substantially free from water. We can maintain the drying bed E at a desirably low temperature, as by means of cooling coils (not shown in the drawing) buried in the silica gel bed.

Catalyst chamber F contains a bed, 30 inches in diameter and 5 inches in height, of 6–8 mesh Tyler activated silica gel particles. In passage through this bed, at a rate of approximately 100 ft./min., the NO content of the furnace gas is oxidized to NO₂. The gas exists from chamber F, and contains 5.4% CO₂, 13.3% O₂, 80.3% N₂ and 0.97% NO₂. We can maintain the oxidation bed at any desirably low temperature by effecting heat exchange with the gases passing therethrough.

Refrigerator G comprises chamber-enclosed water or brine cooling coils, of sufficient area and so operated as to cool the NO₂-containing gas, effluent from chamber G, to approximately 60° F. before the gas passes to the NO₂ absorber.

NO₂ adsorption bed H comprises a bed, 30 inches in diameter and 36 inches tall, of adsorbent silica gel particles of about 6–8 mesh, Tyler screen. In its passage through this bed the gas is denuded of its content of NO₂, and thereafter may be wasted to the stack, or used for cooling or drying in other steps of the process.

The continued passage of furnace gas serially through the above described pieces of equipment B, E, F, G and H is continued until an economically satisfactory approach to complete saturation of bed H with NO₂ has been effected. Thereupon, valve 1 is opened and valve 2 is closed, so as to deflect the furnace gas to the stack instead of to the recovery system, and the step of desorbing NO₂ is initiated. The desorption equipment includes a heat interchanger I, a gas pump J, and conduits communicating between the heat interchanger and one end of bed H, and between the other end of bed H and the pump in such manner as to effect circulation of a gas serially through the heat interchanger and the NO₂ adsorption bed. Heat interchanger I is, in this specific example, a coiled pipe in a furnace; however, it may be a pebble bed heatable by gas effluent from the NO furnace, or any other suitable means of heating a gas to a temperature of the order of 165° C. or above without undue contamination of the gas.

To initiate desorption, valves 3 and 5 are closed, valve 9 is opened, and the pump J is put into operation. Pump J draws "atmosphere" (i. e., a gas mixture of air and NO₂) from one end of NO₂ adsorption bed H, and forces said gas through heat interchanger I and back into bed H at the opposite end of the latter. The heated circulated gas transfers its heat to the contents of bed H thereby liberating some of the adsorbed NO₂, which liberated NO₂ adds to the stream of circulated gas. Such circulation is continued until the NO₂ adsorption bed H and its contents have reached the temperature of about 165° C. As the bed becomes heated, adsorbed NO₂ is progressively liberated and a gas pressure is built up in the circuit. When a predetermined pressure has been reached, a safety valve 10 releases, allowing a stream of substantially pure NO₂—e. g., a 98% pure NO₂, diluted only by the small amount of air originally in the line and in bed H—to pass out of the line either to a condenser (not shown) wherein it may be liquefied, or into a water tower (not shown) wherein it may be converted into nitric acid, or to a silica gel bed for storage, or to another piece of equipment (not shown) appropriate to the use to which the pure NO₂ is to be put. The bed H releases approximately 70% of its content of NO₂ on being heated to 165° C. by the method described.

In order to release more of the adsorbed NO₂ from bed H, we sweep the latter with dry air at approximately 165° C., by which expedient we recover an additional 25% of the NO₂. To effect this result, valve 8 is opened, valve 9 is closed, and atmospheric air is drawn, by the pump J, through a drying bed R (wherein it loses its content of moisture) and thence is forced through heat interchanger I (wherein it is heated to 165° C.) and thence through NO₂ adsorption bed H. While the amount of dry hot air so employed is determined mainly by the degree of dilution tolerable in the plant being served, we prefer to limit the amount of air to one to three times the gaseous volume of NO₂ originally on the gel bed, and to take off a gas mixture containing approximately 20% NO₂ and 80% air, which gas mixture is adapted to be pumped through a water tower (not shown) for conversion of its NO₂ content into nitric acid.

The desorption operation is approximately 95% complete, 5% of the NO₂ originally present being desorbed in later desorptions.

Drying bed E is then dehydrated and cooled, and NO₂ adsorption bed H is cooled, for reuse of these agencies. For desorbing the water content of bed E the following operation is effective. Valves 4, 6 and 11 are opened and valves 9, 8, 3 and 2 are closed. Atmospheric air is pumped by pump J, through heat interchanger I (wherein it is heated to 180° C.), and thence through bed E, the air effluent from bed E wasting to atmosphere through valve 6. This operation is continued until water desorption is complete.

The cooling of beds H and E is effected as follows: Valve 11 is closed and valve 7 is opened, and compressed air (from a source not shown) is blown through drying bed R, the refrigerator G, and thence serially through beds H and E, venting to atmosphere through valve 6, for a period sufficient to cool the latter beds to the extent desired. Before a new adsorption cycle is begun, valves 3 and 5 are opened and valves 4, 6 and 7 are closed. Thereupon, when valve 1 is closed and valve 2 is opened, NO-containing furnace gas can pass serially through agencies B, E, F, G and H, and the gas effluent from H to stack.

The recovery system shown in Fig. 2, while essentially the same as that shown in Fig. 1, illustrates in greater detail an equipment assemblage adapted for the uninterrupted handling of a continuous stream of the NO-containing furnace gas. In this figure, the NO furnace and the blower feeding same are shown: these elements, of course, are not parts of the recovery system being claimed herein, but are included in the drawing for the sake of completeness and clarity.

In Fig. 2, parts B, E, F, G and H are like the respectively marked parts of the assemblage shown in Fig. 1. However, it is to be noted that two drying beds (E) are employed in alternating succession, and that three NO₂ adsorption beds (H) are employed in alternating succession.

A and A' are pebble chambers, each functioning, in alternate succession, as a heat interchanger for partially cooling the furnace gas and conserving the heat so abstracted from the gas. In Fig. 2, pebble chamber A is so functioning, while at the same time pebble chamber A' is being cooled, by means of a current of atmospheric air, for subsequent use in place of A. The air effluent from A' is relatively highly heated, and its heat is made use of in a later stage of the complete recovery process as hereinafter described. If the temperature of the stack gases from the furnace are always kept at a very low value it may not be economical to recover the heat and A and A' will then not be used.

Standard heat exchangers may replace the pebble bed heat exchangers just described.

Cooling tower B functions to cool the furnace gas (effluent from A) to about 25° C., so quickly as to avoid any appreciable oxidation of the NO content of the furnace gas. Water vapor, from the air fed to the NO furnace and from combustion of fuel in the NO furnace, also is removed from the gas to the extent consistent with the vapor pressure of water at 25° C., viz., 23.7 mm. Tower B serves also to remove dust from the gas, thereby protecting silica gel contents of subsequent pieces of equipment employed in the system.

Part C is a spray tower in which a 50% $Ca(NO_3)_2$ solution is circulated. This solution, which has a vapor pressure of about 12 mm. at 25° C., serves to cut in half the amount of water carried by the furnace gas effluent from cooling tower B. In so functioning, the calcium nitrate solution becomes diluted and its temperature is raised (by the heat of absorption effected in tower C). Furnace gas effluent from C contains only about 1.5% of water.

In part D, which is a spray tower similar in construction to tower C, the so-diluted and heated calcium nitrate solution is or may be concentrated to 50% strength and cooled by contacting same with cool dry air obtained from another and later to be described point in the system. The so concentrated and cooled solution is delivered to the top of tower C by a circulating pump.

Drying bed E is a silica gel bed 8" in depth, and having such area that approximately 50 to 100 cu. ft. of gas can pass through one sq. ft. of bed per minute. The mesh size of the gel particles may be 6–8 Tyler. In its passage through bed E the furnace gas is substantially completely dehydrated, with practically no oxidation of NO.

Drying bed E' is identical with E. While E is functioning as above described, E' is being desorbed of water and activated by passing hot air, effluent from A' or from an alternate heating means, therethrough. After desorption and activation have been effected, bed E' is cooled with a stream of cool dry air effluent from part H, hereinafter described. Beds E and E', which are used in alternating succession for the final drying of the furnace gas, may if desired be provided with cooling coils (not shown) buried in the mass of silica gel particles, adapted to maintain a desired low temperature in the beds during the step of dehydrating the furnace gas. The coolant may be for example cold water or brine.

The dry NO-containing gas effluent from bed E passes through catalyst chamber F, wherein the oxidation of NO to $NO_2$ is effected, and thence through refrigerator G wherein the gas is cooled, as described above with reference to Fig. 1. As here illustrated, catalyst bed F is 4-6 inches deep and of the area described above with reference to beds E and E'. The silica gel particles may have a mesh size of 6-8 Tyler. This catalyst bed operates continuously and without need for heating or reactivation—except when moisture inadvertently goes by bed E or E' and accumulates in chamber F.

We prefer so to operate refrigerator G as to cool the dry furnace gas, now containing about 1% $NO_2$, to approximately 15° C.; however, where cost of refrigeration is high we can sacrifice some of the good effect of the lower temperature and operate to cool the gas less drastically, e. g., at a temperature between 15° and 25° C. It is to be observed, here, that the lower the temperature of the $NO_2$ the greater is the amount of the latter absorbed in the $NO_2$ absorption bed H. The cost of cooling must be balanced against the saving due to increased absorptive capacity of the gel at the lower temperature.

Part H is a bed, 36 inches deep, of the 6-8 mesh silica gel particles; its area is such that about 50 cu. ft. of gas are passed through 1 sq. ft. of bed per minute. At first the $NO_2$ is entirely removed and the absorption is continued for about 30 minutes or until the exit gas contains about 25% of the entering gas—namely, about 0.25% of $NO_2$, where the gas entering is at 1%. The average uptake over the whole 30 minutes is about 95% of the total input of $NO_2$ where the bed is held practically isothermically at about 15° C.

The gas effluent from part H is cool dry "air" (i. e., mixture of nitrogen and oxygen, with some $CO_2$) which we use for concentrating and cooling salt solution in part D, for preparing (cooling) the drying bed E' for reuse in place of E, and also for cooling the $NO_2$ adsorption beds.

After 30 minutes' use of $NO_2$ adsorption bed H this latter is as saturated with $NO_2$ as we care to have it go, and hence we switch the incoming $NO_2$-containing gas to another similar $NO_2$ adsorption bed—say, to H''—which has been made ready for $NO_2$ adsorption. We make use of three beds, H, H' and H'' in alternating succession. As shown in the drawing, Fig. 2, H' is being desorbed of $NO_2$ and activated, and H'' is being cooled ready for reuse in $NO_2$ adsorption, while H is being "loaded" with $NO_2$ as above described. The equipment for desorbing and activating each bed in alternating succession is shown beside bed H', but it is to be understood that said equipment operates similarly with each of the other beds successively.

Part I is a furnace, e. g., a gas-fired furnace, enclosing a heating coil through which latter $NO_2$ (with a little initially contained air) drawn from bed H' is pumped by a light weight, greaseless, gas-circulating pump J, on its way back to bed H'. The heating step is so effected that the contents of bed H' are gradually heated to but not materially higher than 165° C.

$NO_2$ liberated from the silica gel bed passes from H' to a cooling coil L about which cold water, brine or equivalent fluid refrigerant is flowed. The extent of the cooling here effected is variable, being determined by the exigencies of the occasion. That is to say, the cooling brought about in coil L may if desired be sufficiently drastic to liquefy the $NO_2$ (boiling point 21° C.), and we have illustrated in Fig. 2 the possibility of diverting the product from L to a tank for storage of liquid $NO_2$. Or, the cooling may be less drastic and result merely in discharging a relatively cold gaseous product, viz., concentrated $NO_2$, or eliminated altogether.

For removing further amounts of $NO_2$ from the silica gel (bed H') by means of hot dry air, we open valve K and introduce into the circuit dry air effluent from bed H: the dry air is pumped by pump J through the heater I wherein it is heated to 165° C. and thence through H'.

The $NO_2$-air mixture resulting from this flushing step, after being cooled in L, may, as shown, be passed to a nitric acid tower O. We prefer to interpose in the line a reservoir M for $NO_2$, or $NO_2$-air mixture which reservoir may be a large "empty" chamber or may be a chamber substantially filled with solid adsorbent for $NO_2$, in order to insure the provision of a steady stream of $NO_2$, or $NO_2$-air mixture, passing to tower O. In the absence of such expedient there would or might occur fluctuations in $NO_2$ pressure and in $NO_2$ concentration during different portions of the desorption cycle.

Also, we prefer to admit a certain amount of atmospheric air to the gas passing from L to O, as by valve N. This is done in order to maintain the ratio of air to $NO_2$ at some fixed value, e. g., 70% air and 30% $NO_2$, whereby to promote uniform production of concentrated (e. g., 65%) nitric acid in the conventional water adsorption tower O. Tower O is substantially filled with a suitable packing, e. g., tubes, Raschig rings, pebbles or the like, for optimum gas-liquid contact. The gas effluent from tower O is either wasted to atmosphere or passed to a second tower for conserving the NO.

As indicated in Fig. 2, $NO_2$ adsorption bed H'', which previously has been desorbed and activated as described above with relation to bed H', is cooled by passing therethrough a current of dry cool air effluent from part H. After the silica gel in H'' has been suitably cooled so as to be ready for reuse in adsorbing $NO_2$, the $NO_2$-containing gas effluent from refrigerator G will be switched, by suitable operation of the valved conduits, from H to H'', whereupon H will simultaneously be desorbed and activated, and H' will simultaneously be cooled for eventual reuse. In a succeeding third period $NO_2$ will be adsorbed in H', while at the same time H'' is being desorbed and activated and H is being cooled.

The system illustrated in Fig. 3 is similar to that shown in Fig. 2, differing from the latter mainly in that it is designed for use with an NO furnace which operates on half-cycle heating (as described and claimed in application Serial No. 538,898, filed June 6, 1944, by Farrington Daniels, one of the joint applicants named herein), now Patent No. 2,548,002. In the operation of said furnace, fuel is introduced and burned on the upstroke half of the cycle only, and the gaseous mixture effluent from the furnace during that half cycle is kept separate from the gaseous mixture effluent during the downstroke for a part of its travel through the recovery system.

In the co-operating recovery system, the course of the effluent downstroke gas is somewhat similar to that shown in Fig. 2, the furnace gas passing through stages of cooling, drying, accelerated oxidation of NO to $NO_2$, refrigeration, and adsorption of the $NO_2$. In the system shown, the dry $NO_2$-free "air" effluent from $NO_2$ adsorption bed H is, during part or all of the downstroke half of the cycle, led through the air filter S to the NO furnace for use as starting material in the thermal fixation of atmospheric nitrogen as NO. This dry air may be mixed with some fresh moist air. By using this air in the NO furnace, very little water vapor is incorporated in the resulting furnace gas, and hence the latter can, as shown, after passing through heat exchanger A, by-pass water spray tower B and pass instead an indirect cooler T in which the furnace gas is cooled to a low temperature before entering dry bed E.

When the furnace is on upstroke, the course of the effluent gas is as follows: It passes through one or the other of a pair of pebble heat exchangers P and P', wherein it gives up a substantial portion of its heat, and thence to water spray tower B, after which it passes serially through E, F, G, and H. The dry $NO_2$—free air effluent from H is used to cool the silica gel of $NO_2$ adsorption bed H'', and passes from the latter to and through E'' to waste.

Pebble beds P and P' taken as a unit, replace the heater "I" of Fig. 2. As shown, pebble bed P is being so heated, while pebble bed P', having previously been similarly heated, is transferring heat to an air-$NO_2$ mixture being recirculated by pump J between P' and $NO_2$ adsorption bed H'. An air drying bed R is interposed between air inlet valve K and pump J: its function is to dry the air let into the desorption system for scrubbing out the last quantities of desorbed $NO_2$.

Aside from the foregoing, the differences between the system shown in Fig. 3 and that shown in Fig. 2 are as follows:

1. Cooling and dehumidification by liquid means is shown as confined to the use of a water spray tower B, on the upstroke the furnace gas passing serially through A, P, B, E, F, G, and H. Of course, a salt solution spray tower, such as that shown at C in Fig. 2, could, if so desired, be interposed between B and E, or be substituted for B.

2. Three drying beds, E, E' and E'', are employed. As shown in the drawing, E is being employed for adsorbing the final water content of the downstroke furnace gas while, simultaneously, E' is being desorbed, by means of hot air from pebble bed heat exchanger A', and E'' is being cooled, by means of dry cool air from H''.

3. The system shown, being particularly designed for manufacture of nitric acid, does not comprise a condenser, such as element "L" shown in Fig. 2. Nevertheless, it will be obvious that a condenser or other cooler for $NO_2$ or air-$NO_2$ mixtures may be interposed in the line between the adsorption bed, H', and the nitric acid tower O.

4. Also, the system of this example includes a gas pump Q, in the line between reservoir M and tower O, for maintaining a constant flow of air-$NO_2$ mixture to said tower. The air for use in forming said mixture being introduced at another, "earlier," point in the system, the system of this example does not necessarily comprise an air inlet means—such as element "N" of Fig. 2—in the line between reservoir M and tower O; however, such an air inlet means may, if desired, be interposed in the line, e. g., on the suction side of pump Q.

5. The air inlet means of this example includes a silica gel air-drying bed "R" between valve K and pump J.

6. As indicated at "S" in Fig. 3, we can, and prefer to, pass the air going to the NO furnace, and likewise, as indicated at "S'," the air going to pebble bed heat exchangers A and A', through means for removing dust particles from the air. These means may comprise electrostatic precipitators or gas filters. Where the amount of dust carried by the ambient atmosphere is desirably small, or where the effect of dust carried into the system is of little or no importance, we can omit either or both of the dust-removing means S and S'.

In Fig. 4 is shown a modified form of apparatus for carrying out the adsorbing, desorbing and absorbent-preparing steps of the hereinbefore described process while the adsorbent is in "fluid flow."

In this embodiment of the invention the furnace gas, after having been cooled and dried, and after having had its NO content oxidized to $NO_2$ and the heat of oxidation abstracted therefrom, as has previously been described, is passed into and in a generally upward direction through the uppermost chamber "U," of a series of four communicating chambers, positioned one above the other, through which series of chambers finely divided (dust-like) particles of activated silica gel or equivalent solid adsorbent are continuously being showered from a collecting hopper Y above the chamber. The $NO_2$ content of the furnace gas is adsorbed on the surface of the moving particles in being passed through the uppermost chamber, and the so-denuded gas exits from the top of said chamber as cool dry air.

The $NO_2$-containing dust-like adsorbent, after accumulating in a shallow layer over the opening which communicates between the bottom of chamber U and the top of the next lower chamber V, sifts (as does sand the constriction in an hour-glass) through said opening and showers through the so-entered chamber V and accumulates as a shallow layer at the bottom of the latter. During its fall through the second chamber it is heated to 165° C. by contact with an "atmosphere" consisting essentially of gaseous $NO_2$ maintained at 165° C. Said atmosphere is continuously withdrawn from chamber V, near the top of the latter, by means of pump J and is forced by said pump through a heating means I, wherein the gas is heated to 165° C., and thence returned to the chamber at a point near the bottom of the latter. As was stated above, the hot $NO_2$ method effects the desorption of about 70% of the adsorbed $NO_2$. A part, or all, of the sodesorbed NO₂ may be bled from the circulating NO₂ to a point of use not shown.

The adsorbent particles flow from chamber V into, and shower through, the third chamber W (i. e., the chamber next below), and in the course of their fall therethrough are contacted with a counter-current of dry air at 165° C. This latter gas effects the desorption of an additional 25% of the adsorbed NO₂. The resulting mixture of air and NO₂, which desirably may be a 70–30% mixture, may be led—either directly or after passage through a cooling means (not shown)—to a nitric acid tower for the production therefrom of concentrated nitric acid.

The substantially NO₂-free adsorbent particles which collect at the bottom of chamber W pass into, and shower through, the fourth and final chamber X wherein they are cooled by means of a counter-current of dry cool air.

The adsorbent material, thus prepared for re-use, flows from chamber X to an air lift and by the latter is raised to the hopper Y above the uppermost chamber U, from which hopper it descends by gravity and starts a succeeding cycle of adsorption, desorption and preparation for reuse.

It is calculated that for handling approximately 2000 SCFM of furnace gas, the "fluid flow" silica gel system just described requires about 100 lbs. of the dust-like silica gel. The openings from chamber to chamber are so proportioned that about 62 lbs. of the silica gel passes through them per minute. The NO₂ adsorption chamber U is a tower about 10 feet tall and has a cross-sectional area of 20 square feet. The desorbing chamber V is a tower about 5 feet tall and with a cross-sectional area of 1 square foot. The third or NO₂ removing tower W is about 1 foot tall and about 1 square foot in cross sectional area. The cooling tower X is as tall as the NO₂ adsorption chamber, namely 10 feet tall, but has a cross-sectional area one-half that of the latter. The 62 lbs./min. of adsorbent moving from chamber U to chamber V carries about 2.5 lbs. of adsorbed NO₂. For desorbing with hot NO₂, about 60 SCFM of NO₂ are re-cycled between heating means and chamber V with an input of about 3000 B. t. u./min. Tower W uses about 40 SCFM of dry air. Through the fourth or cooling tower X there are blown 650 SCFM of cool dry air.

This last described embodiment of the invention, wherein adsorption, desorption and preparation are effected while the adsorbent material is falling through space, is subject to possible modification. Thus, we can so adjust the apparatus and operate it that each of chambers U, V, W and X is maintained substantially full of the adsorbent material, this latter material flowing from one chamber to the next and being transferred from the bottom of chamber X to hopper Y. Or, we can so modify the apparatus and procedure that in one or more than one or all of the four steps just recited the dust-like activated silica gel is introduced into a current of the dry cool NO₂-containing gas and is carried by the latter to a separatory chamber (e. g., a cyclone chamber) for separating the solid particles from the carrying gas.

In the foregoing examples the rate of flow of air through the silica gel bed was given for illustration as being 50 to 100 cu. ft. per minute per sq. ft. of bed area. It is to be understood that this figure is in no wise limitative, and that considerable flexibility can be tolerated. The present process is applicable to any industrially used particle size of solid adsorbent, and in each specific instance the flow rate is to be correlated to the particle size of the solid adsorbent being used, giving consideration to the economic factors of power losses, attrition losses, equipment size, etc.

It is to be understood that known equivalents of pieces of equipment specifically named may be substituted for the latter. Thus, for example, it is to be understood that refrigerator G may be any desirable known type of refrigeration unit, that heat-interchanger I may be any known equivalent of the specific heating means recited above, and that pump J may and ordinarily would be a blower.

This application is a continuation in part of our application Serial No. 555,848, filed September 26, 1944, for "Nitric Oxide Recovery System," now forfeited.

We claim:

1. Process of concentrating and recovering nitrogen dioxide from a gas mixture comprising nitrogen, oxygen and a small amount of nitrogen dioxide, which comprises passing the gas mixture in a substantially anyhdrous and cool state through a mass of adsorbent silicon dioxide patricles, of a temperature not substantially higher than normal room temperature, whereby the nitrogen dioxide is separated from the gas mixture in adsorbed state on the solid adsorbent particles, effecting heat exchange with the gas during the adsorption step to maintain the gas in a cool condition, thereafter heating the mass of nitrogen dioxide-containing silicon dioxide particles to desorption temperature by forcing through said mass a current of a substantially pure nitrogen dioxide maintained at desorption temperature until the temperature of said mass has reached desorption temperature, the system being under the superatmospheric pressure of said desorbing gas, and recovering the nitrogen dioxide so desorbed.

2. Process defined in claim 1, characterized in that the solid adsorbent material is in finely divided fluent form, and in that the nitrogen dioxide-containing gas is contacted with the adsorbent while both are in motion, the period of contact being sufficient to effect adsorption of the NO₂ content of the gas, whereafter the residual gas is separated from the adsorbent, and NO₂ thereafter is desorbed from the adsorbent by heating in the manner defined in claim 1.

3. The process defined in claim 1, characterized in that solid adsorbent particles move by gravity successively through spacially separate zones of adsorption and of desorption, and thereafter are raised to repeat said gravitational movement.

4. Process of recovering as nitrogen dioxide, in relatively concentrated form, the nitrogen dioxide content of a dry gas mixture comprising nitrogen, oxygen and a small amount of nitrogen dioxide, which comprises passing the dry gas mixture through a mass of solid adsorbent, whereby the nitrogen dioxide is separated from the gas mixture in adsorbed state on the solid adsorbent particles, thereafter heating the mass of nitrogen dioxide-containing solid adsorbent particles to desorption temperature by forcing through said mass a current of substantially pure nitrogen dioxide maintained at desorption temperature until the mass has reached desorption temperature, the system being at about atmospheric pressure, and recovering the nitrogen dioxide so described.

5. Process of recovering as nitrogen dioxide, in relatively concentrated form, the fixed nitrogen content of a dry gas mixture comprising nitrogen, oxygen and a small amount of fixed nitrogen essentially in the form of nitric oxide which comprises catalytically oxidizing the nitric oxide content of the dry gas mixture to nitrogen dioxide by passing the gas stream through a mass of solid adsorbent particles carrying thereon adsorbed nitrogen dioxide, adsorbing the nitrogen dioxide content of the gas stream by passing through a mass of adsorbent silicon dioxide particles at a temperature not substantially higher than normal room temperature, whereby to separate the nitrogen dioxide content from the residual gas, and thereafter desorbing and recovering the nitrogen dioxide from the adsorbent by heating the adsorbent to desorption temperature by forcing through said mass a current of substantially pure nitrogen dioxide maintained at desorption temperature, the system being at about atmospheric pressure.

6. Process of recovering as nitrogen dioxide, in relatively concentrated form, the fixed nitrogen content of a dry gas mixture comprising nitrogen, oxygen and a small amount of fixed nitrogen essentially in the form of nitric oxide which comprises catalytically oxidizing the nitric oxide content of the dry gas mixture to nitrogen dioxide by passing the gas stream through a mass of solid adsorbent particles carrying thereon adsorbed nitrogen dioxide, adsorbing the nitrogen dioxide content of the gas stream by passing through a mass of solid adsorbent particles whereby to separate the nitrogen dioxide content from the residual gas, and thereafter desorbing and recovering the nitrogen dioxide from the adsorbent by heating the adsorbent to desorption temperature by forcing through said mass a current of substantially pure nitrogen dioxide maintained at desorption temperature, the system being at about atmospheric pressure.

7. The process defined in claim 6, in which the solid adsorbent employed in at least one of the steps catalytic oxidation, adsorption and desorption is in fluent form and is in motion during the period of contact with the gas undergoing treatment.

8. Process of recovering as nitrogen dioxide, in relatively concentrated form, the fixed nitrogen content of a gas mixture comprising nitrogen, oxygen, water vapor and a small amount of fixed nitrogen essentially in the form of nitric oxide, the gas mixture being initially at an elevated temperature, which comprises cooling and partially dehumidifying the hot gas mixture by passing the latter through a heat exchanger, drying the gas mixture by passing the same through and in direct contact with a mass of adsorbent silicon dioxide particles thereby selectively removing the water vapor while the mixed nitrogen is still essentially in the form of nitric oxide, catalytically oxidizing the nitric oxide content of the dry gas mixture to nitrogen dioxide by passing the latter through a mass of solid adsorbent particles carrying thereon adsorbed nitrogen dioxide, cooling the resutling gas mixture to about 25° C., adsorbing the nitrogen dioxide content of the cooled gas by passing through a mass of adsorbent silicon dioxide particles whereby to separate the nitrogen dioxide content from the residual gas, effecting heat exchange with the gas during the adsorption step to maintain the gas in a cool condition, and desorbing and recovering the nitrogen dioxide from the adsorbent by forcing a current of gas comprising nitrogen dioxide maintained at desorption temperature through and in direct contact with said particles until the latter are heated to desorption temperature, and thereafter flushing the so heated particles with dry inert gas heated to desorption temperature.

9. Process of recovering as nitrogen dioxide, in relatively concentrated form, the fixed nitrogen content of a gas mixture comprising nitrogen, oxygen, water vapor and a small amount of fixed nitrogen essentially in the form of nitric oxide which comprises selectively removing the water vapor from the gas stream by passing the latter through a mass of adsorbent silicon dioxide particles while the fixed nitrogen is still essentially in the form of nitric oxide, catalytically oxidizing the nitric oxide content of the dry gas mixture to nitrogen dioxide by passing the gas stream through a mass of adsorbent silicon dioxide particles carrying thereon adsorbed nitrogen dioxide, thereafter adsorbing the nitrogen dioxide content of the gas stream by passing through a mass of solid adsorbent silicon dioxide particles whereby to separate the nitrogen dioxide content from the residual gas, and thereafter desorbing and recovering the nitrogen dioxide from the adsorbent by forcing therethrough a current of gas comprising nitrogen dioxide maintained at desorption temperature.

10. Process of recovering as nitrogen dioxide, in relatively concentrated form, the fixed nitrogen content of a gas mixture comprising nitrogen, oxygen, water vapor and a small amount of fixed nitrogen essentially in the form of nitric oxide which comprises selectively removing the water vapor from the gas mixture while the fixed nitrogen content of the latter is still essentially in the form of nitric oxide by passing the gas mixture through a mass of solid adsorbent particles at such speed that nitric oxide is not materially oxidized, catalytically oxidizing the nitric oxide content of the dry gas mixture to nitrogen dioxide by passing through a mass of solid adsorbent particles carrying thereon adsorbed nitrogen dioxide, adsorbing the nitrogen dioxide content of the gas mixture by passing through a mass of solid adsorbent particles whereby to separate the nitrogen dioxide content from the residual gas, and thereafter desorbing and recovering the nitrogen dioxide from the adsorbent by forcing therethrough a current of gas comprising nitrogen dioxide maintained at desorption temperature.

11. Process of recovering as nitrogen dioxide, in relatively concentrated form, the fixed nitrogen content of a gas mixture comprising nitrogen, oxygen, water vapor and a small amount of fixed nitrogen essentially in the form of nitric oxide which comprises selectively removing the water vapor from the gas mixture by passing the latter through a mass of adsorbent silicon dioxide particles while the fixed nitrogen is still essentially in the form of nitric oxide, catalytically oxidizing the nitric oxide content of the dry gas mixture to nitrogen dioxide by passing the dry gas mixture through a mass of solid adsorbent particles carrying thereon adsorbed nitrogen dioxide, and thereafter adsorbing the nitrogen dioxide content of the gas mixture by passing through a mass of adsorbent silicon dioxide particles whereby to separate the nitrogen dioxide content from the residual gas.

12. Process of recovering as nitrogen dioxide, in relatively concentrated form, the fixed nitrogen content of a gas mixture comprising nitrogen, oxygen, water vapor and a small amount of fixed nitrogen essentially in the form of nitric oxide which comprises selectively removing the water vapor from the gas stream while the fixed nitrogen content of the latter is still essentially in the form of nitric oxide by passing the latter through a mass of solid adsorbent particles at such speed that nitric oxide is not materially oxidized, catalytically oxidizing the nitric oxide content of the dry gas mixture to nitrogen dioxide by passing the dry gas mixture through a mass of solid adsorbent particles carrying thereon adsorbed nitrogen dioxide, and thereafter adsorbing the nitrogen dioxide content of the gas mixture by passing through a mass of solid adsorbent particles whereby to separate the nitrogen dioxide content from the residual gas.

13. The process defined in claim 12, in which the solid adsorbent employed in at least one of the steps drying, catalytic oxidation and adsorption is in fluent form and is in motion during the period of contact with the gas undergoing treatment.

14. Process of converting to nitrogen dioxide the fixed nitrogen content of a gas mixture comprising nitrogen, oxygen, water vapor and a small amount of fixed nitrogen essentially in the form of nitric oxide, the gas mixture being initially at an elevated temperature, which comprises cooling and partially dehumidifying the gas mixture by passing the hot gas mixture through a heat exchanger, drying the gas mixture while the fixed nitrogen content thereof is still essentially in the form of nitric oxide by passing the same through and in direct contact with a mass of adsorbent silicon dioxide particles at such speed that nitric oxide is not materially oxidized and catalytically oxidizing the nitric oxide content of the dry gas mixture to nitrogen dioxide by passing the latter through a mass of solid adsorbent particles carrying thereon adsorbed nitrogen dioxide.

15. Process of converting to nitrogen dioxide the fixed nitrogen content of a gas mixture comprising nitrogen, oxygen, water vapor and a small amount of fixed nitrogen essentially in the form of nitric oxide which comprises passing a stream of the gas mixture through and in direct contact with a mass of solid adsorbent particles while the fixed nitrogen content of the gas mixture is still essentially in the form of nitric oxide thereby selectively removing the water vapor from the gas mixture, and catalytically oxidizing the nitric oxide content of the dry gas mixture to nitrogen dioxide by passing the dry gas mixture through a mass of solid adsorbent particles carrying thereon adsorbed nitrogen dioxide.

16. The process defined in claim 15, in which the solid adsorbent employed in at least one of the steps drying and catalytic oxidation is in fluent form and is in motion during the period of contact with the gas undergoing treatment.

17. Process of recovering as nitrogen dioxide, in relatively concentrated form, the fixed nitrogen content of a gas mixture comprising nitrogen, oxygen, water vapor and a small amount of fixed nitrogen essentially in the form of nitric oxide which comprises selectively removing the water vapor from the gas mixture while the fixed nitrogen content of the latter is still essentially in the form of nitric oxide by passing the gas mixture through a mass of solid adsorbent particles at such speed that nitric oxide is not materally oxidized, catalytically oxidizing the nitric oxide content of the dry gas mixture to nitrogen dioxide by passing through a mass of solid adsorbent particles carrying thereon adsorbed nitrogen dioxide, adsorbing the nitrogen dioxide content of the gas mixture by passing through a mass of solid adsorbent particles whereby to separate the nitrogen dioxide content from the residual gas, and thereafter desorbing and recovering the nitrogen dioxide from the adsorbent by forcing therethrough a current of gas comprising nitrogen dioxide maintained at desorption temperature, the solid adsorbent employed in the steps of drying, adsorption and desorption being in fluent form and being in motion during the period of contact with the gas.

18. Process of drying a gas mixture comprising nitrogen, oxygen, water vapor and a small amount of fixed nitrogen essentially in the form of nitric oxide, which comprises selectively removing the water vapor from the gas mixture while the fixed nitrogen content of the latter is still essentially in the form of nitric oxide by passing the gas mixture, at such speed that nitric oxide is not materially oxidized, through a mass of particles of a solid adsorbent which has a preferential adsorpability towards water and is relatively inert to nitric acid, the solid adsorbent being in fluent form and being in motion during the period of contact with the gas mixture.

FARRINGTON DANIELS.
WILLIAM G. HENDRICKSON.
ELTON GORDON FOSTER.

REFERENCES CITED

The following references are of record in the file of this patent:

UNITED STATES PATENTS

| Number | Name | Date |
| --- | --- | --- |
| 1,335,348 | Patrick et al. | Mar. 30, 1920 |
| 1,339,494 | Burdick | May 11, 1920 |
| 1,387,857 | McKee | Aug. 16, 1921 |
| 1,391,332 | McKee | Sept. 20, 1921 |
| 1,528,459 | Varess et al. | Mar. 3, 1925 |
| 1,610,288 | Jones et al. | Dec. 14, 1926 |
| 1,989,267 | Caro et al. | Jan. 29, 1935 |
| 2,384,311 | Kearby | Sept. 4, 1945 |

FOREIGN PATENTS

| Number | Country | Date |
| --- | --- | --- |
| 6,155 of 1908 | Great Britain | Mar. 19, 1908 |
| 211,845 | Great Britain | Feb. 26, 1925 |
| 455,734 | Great Britain | Oct. 27, 1936 |
| 456,518 | Great Britain | Nov. 5, 1936 |

OTHER REFERENCES

Williams: "Silica Gel is an Industrial Absorbent," Bulletin No. 5, pages 9 and 10, March 1924, published by Silica Gel Corporation.

Certificate of Correction

Patent No. 2,578,674     December 18, 1951

FARRINGTON DANIELS ET AL.

It is hereby certified that error appears in the printed specification of the above numbered patent requiring correction as follows:

Column 16, line 75, for "described" read *desorbed*; column 17, line 67, for "resutling" read *resulting*; column 20, line 7, for "materally" read *materially*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*

Certificate of Correction

Patent No. 2,578,674                                                    December 18, 1951

FARRINGTON DANIELS ET AL.

It is hereby certified that error appears in the printed specification of the above numbered patent requiring correction as follows:

Column 16, line 75, for "described" read *desorbed*; column 17, line 67, for "resutling" read *resulting*; column 20, line 7, for "materally" read *materially*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*